United States Patent [19]
Delmer

[11] 3,799,441
[45] Mar. 26, 1974

[54] SOLID PELLET AND SELF CLEANING IRRIGATION DEVICE

[76] Inventor: William A. Delmer, 16901 Bedford Ln., Huntington Beach, Calif. 92649

[22] Filed: Apr. 5, 1973

[21] Appl. No.: 348,007

[52] U.S. Cl................... 239/145, 239/542, 239/590
[51] Int. Cl............................................. B05b 1/30
[58] Field of Search .......... 239/145, 542, 547, 590; 138/40, 42, 44

[56] References Cited
UNITED STATES PATENTS

| | | | |
|---|---|---|---|
| 3,729,142 | 4/1973 | Rangel-Garza et al. | 239/542 |
| 3,693,888 | 9/1972 | Rondas et al. | 239/547 X |
| 2,196,456 | 4/1940 | Charroin | 239/547 X |
| 3,116,019 | 12/1963 | Graef | 239/542 |
| 3,667,685 | 6/1972 | Rinkewich | 239/542 |

Primary Examiner—M. Henson Wood, Jr.
Assistant Examiner—Michael Y. Mar
Attorney, Agent, or Firm—Harris, Kern, Wallen & Tinsley

[57] ABSTRACT

An irrigation device including a conduit having a plurality of emitters spaced therealong, each emitter being a tubing of relatively small internal diameter relative to that of the conduit, and having a flow interruptive and flow controlling device therein consisting of a flexible longitudinal rib or string having spaced therealong a plurality of transverse baffles.

8 Claims, 6 Drawing Figures

PATENTED MAR 26 1974 3,799,441
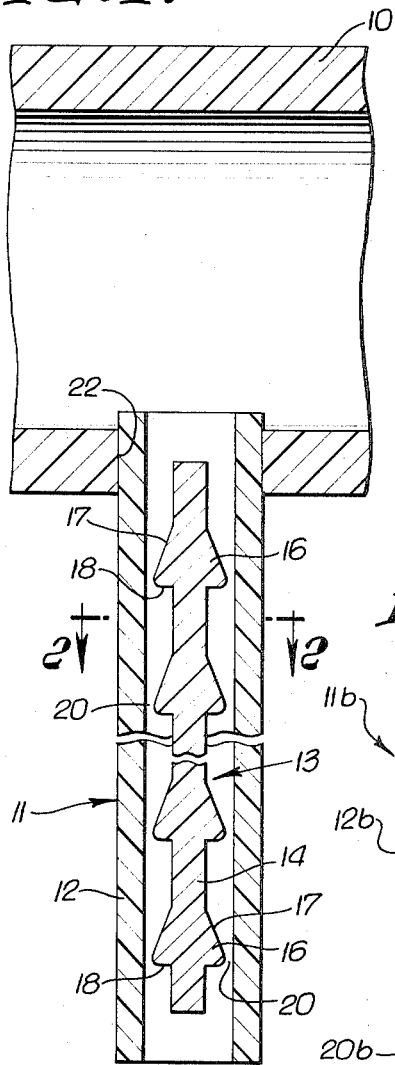
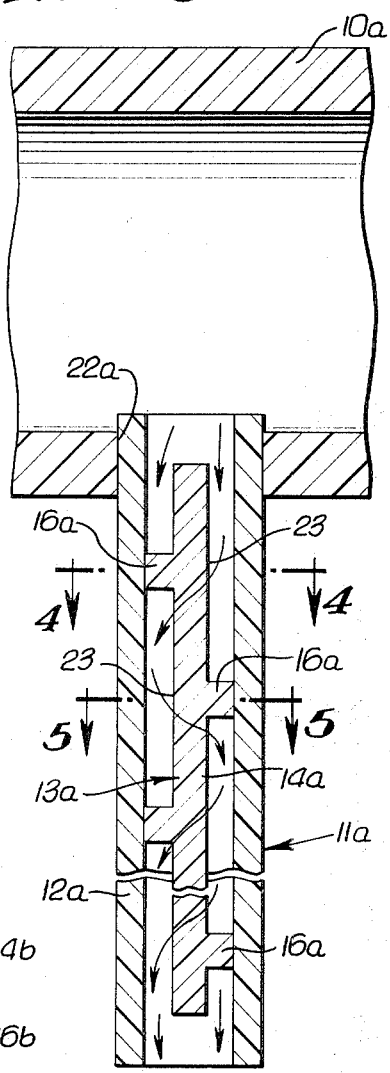
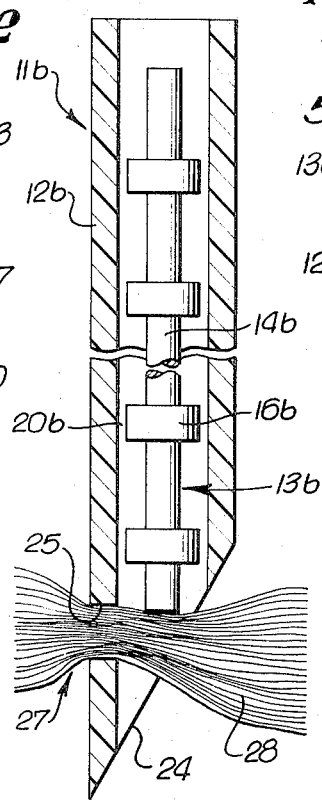

SOLID PELLET AND SELF CLEANING IRRIGATION DEVICE

BACKGROUND OF THE INVENTION

In the last few years drip irrigation has become increasingly popular as a substitute for other irrigation methods, such as sprinkler and furrow irrigation, in the irrigation of crops. Generally, drip irrigation comprises supplying a small volume of water frequently to the root area of plants and trees, and confining the water supplied substantially to such root areas.

Generally, such a drip irrigation system includes a main connected to a supply of water under pressure, the main being of such size as to carry all of the water required for the system at a desired pressure and without undue fluid frictional losses. Connected to the main are a plurality of feeder tubes spaced along the main at desired intevals, for conveying water from the main along crop or tree rows, the feeder tubes being flexible or rigid, and each being of a relatively small diameter only large enough to carry the volume of water desired to be distributed therethrough without undue fluid frictional losses. Spaced along each feeder tube is a plurality of emitters each being designed to distribute water from the feeder tube to a specific plant root area in a desired and uniform volume at frequent intervals. The emitters on the market and known to applicant have wholly failed to attain the latter objective.

Such conventional emitters on the market have been of a variety of forms, most being designed to supply from about 0.5 to 4.0 gallons of water per hour per emitter. The simplest form is merely a desired length of flexible spaghetti tubing of very small diameter. Others include various types of adjustable valves, convoluted passages, filters, and the like.

All of such conventional emitters known to applicant tend to clog quickly with dirt or other solid materials in the irrigation water to an extent decreasing the volume of water supplied therefrom to undesirably low levels, requiring replacement or removal and cleaning of each emitter at frequent intervals, with an attendant undesirably high cost. None of such conventional emitters are self flushing and none can be readily, if at all, flushed from a remote location of solid materials collected therein, to restore their desired flow characteristics. In all such emitters it is essential to provide filtering means for filtering such solid materials from the irrigation water before it reaches each emitter or having a filter built into each emitter, with the attendant high cost and impracticability of flushing or cleaning said filters of such foreign material deposited therein. All of such emitters known to applicant are relatively high initial cost devices, making them uneconomical for irrigating many low profit crops.

Conventional drip irrigation systems having emitters are disclosed in the U.S. Pats. to Richards, No. 2,769,688, issued Nov. 6, 1956, and Babin, U.S. Pat. No. 2,798,768, issued July 9, 1957. Another such conventional emitter is as disclosed in U.S. Pat. No. 3,693,657, issued to Donald O. Olson on Sept. 16, 1972.

Another serious problem in the use of such conventional emitters arises from the fact that much irrigation water, particularly in certain sections of California, contains a high proportion of soluble salts, which, with the small volume of water carried by each emitter, tend to crystalize out of the water at the inlet and/or outlet of the emitter, resulting in clogging of the emitter with the disadvantages noted above in connection with solid foreign material in the irrigation water.

THE INVENTION — GENERALLY

The primary objects of this invention are to provide in a drip irrigation system a low cost emitter, which is cheap to make and install, and which is substantially self-flushing of solid foreign materials and crystalized salts, to maintain a continuous flow delivered by each emitter substantially uniform over a substantial period of time, thereby obviating most of the disadvantages of conventional emitters.

I prefer to accomplish the foregoing objects by providing an emitter comprised of a short tube of small diameter, either flexible or inflexible, which extends both into and out of a feeder tubing, the short tube having therein a flow controlling device extending longitudinally in the tube and comprised of a longitudinally extending member of small cross-sectional area, such as a string or rod, having thereon a plurality of spaced transverse baffle elements each of which is at least partially circular, the external diameter of such circular portion being slightly less than the internal diameter of the tube to provide a small clearance therebetween, the flow controlling device being flexible to permit its deformation in response to liquid flow through the tube to permit the passage of solid foreign materials through the emitter to prevent its clogging by said foreign materials.

Another object of the invention is to provide such an emitter which has means for preventing entry of dirt, or water containing dirt, into the emitter when the irrigation system in which the emitter is installed is shut down, drains, and then pulls a vacuum tending to suck such foreign materials into the emitter. I prefer to accomplish this by providing a small bundle of strands of yarn or other fibrous materials adjacent the outlet end of the emitter.

THE DRAWING

FIG. 1 is a longitudinal sectional view of a short section of feeder tubing having a preferred form of emitter of the invention installed therein;

FIG. 2 is a cross-sectional view taken on the line 2—2 of FIG. 1;

FIG. 3 is a view similar to FIG. 1, but showing an alternative form of emitter;

FIG. 4 is a cross-sectional view taken on the line 4—4 of FIG. 3;

FIG. 5 is a cross-sectional view taken on the line 5—5 of FIG. 3; and

FIG. 6 is a fragmentary longitudinal sectional view of an alternative form of emitter.

DETAILED DESCRIPTION OF THE INVENTION

Referring to the drawing, FIG. 1 shows a feeder tubing 10 and an emitter 11. The feeder tubing 10 is conventionally formed of polyvinyl chloride, although other flexible or inflexible materials may be used therefor, and may have an internal diameter of about 0.375 inches, or larger. A feeder tubing 10 of such size will be adapted to carry irrigation water at any conventional pressure along its length, which may be up to several thousand feet, being supplied by a pump or other source of irrigation water under the desired pressure.

The emitter 11 includes a tube 12, which may be formed of flexible or inflexible material and is of relatively small internal diameter, e.g., about 1/32 inches, or larger, and of any desired length. The tube 12 has therein a flow controlling device 13 which includes a longitudinally extending member 14, shown as a cylindrical rod, but which may have any desired cross-section. The member 14 is formed of a flexible material, such as Nylon, and of a relatively small diameter permitting its deformation as explained hereinafter. The member 14 carries thereon a plurality of transverse circular baffle elements 16 which are longitudinally spaced along the member 14 and rigidly secured thereto or molded thereon. Each of the baffle elements 16 preferably has a generally frustoconical face 17 and a flat face 18. The external diameter of each of the baffle elements 16 is slightly less than the internal diameter of the tube 12 so as to provide a small clearance 20 therebetween. For example, if the internal diameter of the tube 12 is about 0.075 inches the diameter of each of the baffle elements 16 preferably is about 0.070 inches. The tube 12 extends through a hole 22 in one side of the feeder tubing 10 and is secured in position thereby by friction, a suitable adhesive, or by heat sealing between the tube and the tubing.

Although only one emitter 11 is shown in the drawing, it is to be understood that additional similar emitters are to be spaced at desired intervals along the length of the feeder tubing 10 and assembled with respect thereto as shown. If the feeder tubing 10 is formed of a polyvinyl chloride or similar material, as is usual, the holes 22 therein can readily be formed by merely puncturing the tubing at the intervals desired and the emitters 11 inserted therein in the field, or the feeder tubing can be equipped with the desired number of emitters at the desired spaced intervals at the factory and sold in standard lengths.

As indicated above, one end of the feeder tubing 10 is connected to a pump, or other source of irrigation water, to provide a desired pressure on the water in the feeder tubing, e.g., 1 to 100 p.s.i.g. or more. The other end of the feeder tubing is plugged by a conventional plug (not shown), which is preferably removable to permit flushing of the feeder tubing, as is standard practice. Irrigation water flowing through the feeder tubing 10 flows outwardly through the emitter tube 12 past the baffle elements 16 and through the clearances 20, due to the fluid pressure differential between the inner and outer ends of the tube, and is deposited at a root zone of a plant to be irrigated. The flow controlling device 13 is very cheap to fabricate, as the tube 12 is merely a section of cheap conventional tubing and the flow controlling device 13 may be readily and cheaply molded from a synthetic material such as polyvinyl chloride, and this is an object of the invention. The frustoconical form of the baffle elements 16 is efficacious in directing the flow of water and contained solids to the periphery of the baffle elements and the clearance 20 to assist in the self-cleaning function of the flow controlling device 13.

An emitter 11, having a tube 12 about six inches in length, having an internal diameter of about 0.075 inches, and having a flow controlling device 13 having 25 baffle elements 16, each having an external diameter of about 0.070 inches, has been extensively tested under normal operating conditions, utilizing water in the feeder tubing 10 at a pressure of about 15 p.s.i.g. Using clean water in such tests it was found that the emitter 11 would discharge about 100 milliliters of water per minute from the outer end of the tube 12, which, under normal irrigation use, is a desired discharge to provide suitable irrigation for most row crops and trees and that such volume of discharge continued throughout the periods of the tests. Using dirty water, simulating dirty water frequently encountered under normal field irrigating conditions and containing a high content of fine solid foreign materials, it was found that the discharge from the emitter 11 initially dropped substantially from the comparable discharge using clean water, i.e., to about only 10 to 25 milliliters per minute, indicating clogging of the emitter by such solid foreign materials. However, after brief flushing of the system the discharge from the emitter 11 quickly rose to 90 milliliters per minute, an acceptable discharge for normal irrigating purposes, which continued throughout the extended periods of the tests, indicating that the emitter is self-cleaning of solid foreign materials during operation. This latter result could not be obtained with comparative tests of conventional emitters on the market, all of which clogged with solid foreign material from the water flow after a relatively brief period of operation.

In the use of the emitters 11 in such tests it was noted that frequently they produced an audible hum during operation, indicating vibration of the flow controlling device 13, obviously caused by the flow of water through the emitter. It is to be noted that as water flows through each clearance 20, it does so at relatively high velocity and then passes into an area of relatively large cross section between adjacent baffle elements 16 to reduce substantially such velocity and create substantial turbulenece in the flow. I believe that such abrupt changes in velocity and direction of flow of water as it passes through the emitter 11 causes such vibration, and that such vibration alters the anjular shape of each clearance 20, which in turn passes, or pulverizes to finer volume, particles of solid foreign material carried by such flow, and thereby is responsible for the self-cleaning characteristics of my emitters.

FIGS. 3, 4, and 5 show an alternative embodiment of the invention, generally similar to the embodiment illustrated in FIGS. 1 and 2, similar parts being identified by similar numerals with the suffix a added to each. This form differs from that shown in FIGS. 1 and 2 in that the baffle elements 16a are merely flat disks having a pie-shaped section 23 cut out of each. Such cut-out sections 23 are shown as being about 180°, but it is to be understood that smaller cut-outs, e.g., about 45°, or less, may be employed, if desired. It is to be noted that a cut-out 23 in one baffle element 16a is preferably staggered circumferentially relative to the cut-out in the two adjacent baffle elements, the purpose of which is to cause frequent and more abrupt changes in the direction of flow of water through the emitter, than the embodiment of FIGS. 1 and 2, which is sometimes an advantage if the irrigation water passed through the device has an unusually high content of foreign materials. Otherwise, the results obtained in tests indicated that both forms of emitters are self-cleaning and have generally the same operating characteristics.

FIG. 6 shows another embodiment of the invention, generally similar to the preceding embodiments, similar parts being identified by similar numerals with the suffix *b* added, but showing only the outer portion of the emitter 11*b*. In it, the outer end 24 of the tube 12*b* is cut at about a 45° angle, a hole 25 is provided in the tube 12*b*, and a flexible bundle 27, of strands of yarn or synthetic fibers is passed through the hole 25 and has an end 28 which loosely extends from the tube 12*b*. In this form of the invention the bundle 27 retains the flow controlling device 13*b* in the tube 12*b*, yet permits the device 13*b* to be reciprocated longitudinally a short distance, permitting manual assistance in clearing the emitter 11*b* of solid foreign materials, which is an advantage of this form of the invention. The bundle 27, which substantially fills the cross-section of the tube 12*b*, also acts as a barrier to the entrance of dirt or other foreign materials into the outer end of the tube, which is another advantage of this form of the invention, yet the outer end 28 of the bundle 27 being flexible moves outwardly in response to water flow through the tube 12*b* and does not substantially impede such flow or increase the fluid pressure drop through the tube 12*b*, acting as a flapper check valve to prevent a reverse flow into the outer end of the tube 12*b*, which is another advantage of this form. It is also to be noted that in this form the baffle elements 16*b* are shown as circular disks, as substitutions for the baffle elements 16 and 16*a* of the preceding forms, merely for illustrative purposes.

Field tests on the various forms of the invention disclosed herein establish that my emitter may be used for irrigation purposes over long periods of time without any necessity of manual adjustment or replacement thereof without any substantial reduction in the volume of the discharge therefrom, as is required of the competitive emitters with which I am familiar, e.g., that disclosed in said Olson patent. The importance of this can be appreciated from the practical example of a one hundred acre orchard having a normal 10,000 trees to be irrigated, which according to conventional procedure would require four emitters per tree, or forty thousand emitters. Even a small percentage of failures of said emitters substantially increases the labor cost of maintaining the irrigation system, greatly reduced by my invention.

Several illustrative embodiments of the invention have been described herein, but I do not desire to be limited thereto, but desire to be afforded the full scope of the following claims:

I claim:

1. In an irrigation device, the combination of:
 a feeder tubing adapted to convey irrigation water at a desired pressure and volume for irrigation purposes;
 a plurality of emitters spaced along the length of said feeder tubing, each of said emitters including
  a relatively short tube of relatively small internal diameter, one end of which extends into said tubing and the other end of which extends beyond the exterior of said tubing, and a flow controlling device in said tube and consisting of a longitudinally extending member having thereon aplurality a plurality longitudinally spaced transverse baffle elements each of which is at least partially circular, the external diameter of the circular portion of each baffle element being slightly less than the internal diameter of said tube to provide a small clearance therebetween and a loose fit of the flow controlling device within said tube to permit the shape of said clearance to alter in response to a flow of water through said tube, each of said members being flexible to permit the flexing thereof between said baffle elements and the movement of the member as a whole, and each said tube having restraining means for restraining its said member against movement out of said other end of said tube.

2. A device as defined in claim 1 in which each of said baffles has one face generally frustoconical in longitudinal cross section.

3. A device as defined in claim 1 in which said restraining means is a bundle of fibers adjacent the outer end of said tube and fixed thereto to act as a barrier to the entrance of foreign materials into said tube from the exterior thereof.

4. A device as defined in claim 3 in which said bundle of fibers extends through said flow control device to secure it relative to said tube but permitting relatively small movement therebetween.

5. A device as defined in claim 3 in which said bundle of fibers has a free flexible end which serves as a flapper check valve, movable away from said tube to permit liquid flow therefrom but closing the end of said tube upon a cessation of said flow to prevent the entrance of foreign materials into said tube.

6. In an emitter for an irrigation system, the combination of:
 a tube having a relatively small internal diameter and a length at least five times said internal diameter; and
 a flow controlling device in said tube and consisting of a longitudinally extending member having thereon a plurality of longitudinally spaced transverse baffle elements each of which is at least partially circular, the external diameter of the circular portion of each baffle element being slightly less than the internal diameter of said tube to provide a small clearance therebetween and a loose fit of the flow controlling device within said tube to permit the shape of said clearance to alter in response to a flow of water through said tube, said member being flexible to permit the flexing thereof between said baffle elements and the movement of the member as a whole, and said tube having restraining means for restraining said member against movement out of one end of said tube.

7. A device as defined in claim 6, in which said flow controlling device is formed from a synthetic plastic material and is deformable.

8. A device as defined in claim 6, in which said flow controlling device is a rod having thereon said baffle elements.

* * * * *

PO-1050
(5/69)

UNITED STATES PATENT OFFICE
CERTIFICATE OF CORRECTION

Patent No. 3,799,441      Dated March 26, 1974

Inventor(s) William A. Delmer

It is certified that error appears in the above-identified patent and that said Letters Patent are hereby corrected as shown below:

Column 1, line 58   "2,769,688"   should be --2,769,668--;

Column 3, line 26   "thereby"   should be --therein--;

Column 4, line 37   "turbulenece"   should be --turbulence--;

Column 4, line 40   "anjular"   should be --annular--;

Column 5, line 61 - Column 6, line 1, delete "aplurality" (first occurrence)

Column 6, line 1, after "plurality" insert --of--.

Signed and sealed this 1st day of October 1974.

(SEAL)
Attest:

McCOY M. GIBSON JR.                   C. MARSHALL DANN
Attesting Officer                     Commissioner of Patents